United States Patent
Nishiyama (10) Patent No.: US 11,232,291 B2
(45) Date of Patent: Jan. 25, 2022

(54) POSTURE ESTIMATION SYSTEM, POSTURE ESTIMATION APPARATUS, ERROR CORRECTION METHOD, AND ERROR CORRECTION PROGRAM

(71) Applicant: Sony Interactive Entertainment Inc., Tokyo (JP)

(72) Inventor: Akira Nishiyama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 11 days.

(21) Appl. No.: 16/864,601

(22) Filed: May 1, 2020

(65) Prior Publication Data
US 2020/0364447 A1 Nov. 19, 2020

(30) Foreign Application Priority Data
May 16, 2019 (JP) ............................. JP2019-092809

(51) Int. Cl.
*G06K 9/00* (2006.01)
*G06T 7/70* (2017.01)

(52) U.S. Cl.
CPC ..... *G06K 9/00335* (2013.01); *G06K 9/00362* (2013.01); *G06T 7/70* (2017.01); *G06T 2207/30196* (2013.01); *G06T 2207/30204* (2013.01); *G06T 2207/30244* (2013.01)

(58) Field of Classification Search
CPC .. G06K 9/00335; G06K 9/00362; G06K 9/03; G06K 9/2063; G06T 7/70; G06T 2207/30196; G06T 2207/30244; G06T 2207/30204; G06T 7/73
See application file for complete search history.

(56) References Cited

U.S. PATENT DOCUMENTS

| | | | |
|---|---|---|---|
| 2018/0089841 A1* | 3/2018 | Dai | G06T 7/277 |
| 2018/0101223 A1* | 4/2018 | Ishihara | G06F 3/147 |

FOREIGN PATENT DOCUMENTS

JP 2017-053739 A 3/2017

* cited by examiner

*Primary Examiner* — Qian Yang
(74) *Attorney, Agent, or Firm* — Katten Muchin Rosenman LLP (57) ABSTRACT

A posture estimation system includes: a marker that is mounted on an object; a camera that captures an image of the object; an analysis section that analyzes a posture of the object on a basis of a position of the marker included in a captured image captured by the camera; an inertial measurement section that is provided on the object to detect motion of the object; a calculation section that calculates calculated posture information indicating the posture of the object on a basis of detection information indicating a detection result from the inertial measurement section; an estimation section that estimates the posture of the object on a basis of the calculated posture information and analyzed posture information indicating the posture of the object analyzed by the analysis section; and a correction section that corrects an error included in the calculated posture information on a basis of the analyzed posture information.

7 Claims, 8 Drawing Sheets

POSTURE ESTIMATION SYSTEM, POSTURE ESTIMATION APPARATUS, ERROR CORRECTION METHOD, AND ERROR CORRECTION PROGRAM

CROSS REFERENCE TO RELATED APPLICATIONS

This application claims the benefit of Japanese Priority Patent Application JP 2019-092809 filed May 16, 2019, the entire contents of each of which are incorporated herein by reference.

BACKGROUND

The present disclosure relates to a posture estimation system, a posture estimation apparatus, an error correction method, and an error correction program.

A motion capture system has been known that extracts motion of a subject (see, for example, Japanese Patent Laid-open No. 2017-53739).

A motion capture system described in Japanese Patent Laid-open No. 2017-53739 includes a marker mounted at a feature point on the subject, a plurality of cameras, an information processing apparatus, and a display apparatus.

The plurality of cameras are provided to surround a movable range of the subject and chronologically captures images of the marker. Image processing apparatuses processes captured images chronologically received from the plurality of cameras to calculate coordinates of the marker in a three-dimensional space, that is, three-dimensional information. The display apparatus includes a feature information extraction section and receives information from the image processing apparatus. The feature information extraction section calculates, from three-dimensional chronological position information regarding the marker, a particular physical quantity at each chronological position of the marker to calculate a stride width, a walking speed, and a landing time of the subject, which correspond to feature information regarding the motion of the subject.

SUMMARY

In recent years, a suggestion has been made about estimation of the position and posture of the subject based on the position and posture of the subject measured by the motion capture system as described above and the position and posture of the subject calculated on the basis of detection results from an Inertial Measurement Unit (IMU) mounted on the subject to detect an acceleration and an angular speed.

However, in regard to an acceleration sensor and a gyro sensor included in the inertial measurement unit, detection results from the gyro sensor involve errors accumulated over time due to properties of the gyro sensor. Thus, the actual posture of the subject may deviate from the estimated posture.

It is desirable to solve at least some of the above-described problems, and it is also desirable to provide a posture estimation system, a posture estimation apparatus, an error correction method, and an error correction program that can reduce errors in the estimated posture of an object.

According to a first aspect of the present disclosure, a posture estimation system is provided that includes a marker that is mounted on an object, a camera that captures an image of the object, an analysis section that analyzes a posture of the object on a basis of a position of the marker included in a captured image captured by the camera, an inertial measurement section that is provided on the object to detect motion of the object, a calculation section that calculates calculated posture information indicating the posture of the object on a basis of detection information indicating a detection result from the inertial measurement section, an estimation section that estimates the posture of the object on a basis of the calculated posture information and analyzed posture information indicating the posture of the object analyzed by the analysis section, and a correction section that corrects an error included in the calculated posture information on a basis of the analyzed posture information.

According to another aspect of the present disclosure, a posture estimation apparatus is provided that includes a communication section that externally receives first posture information indicating a posture of an object, an input section that receives detection information indicating a detection result from an inertial measurement unit provided on the object, a calculation unit that calculates, on a basis of the detection information, second posture information indicating the posture of the object, an estimation section that estimates the posture of the object on a basis of the first posture information and the second posture information, and a correction section that corrects, on the basis of the first posture information, an error included in the second posture information.

According to yet another aspect of the present disclosure, an error correction method for correcting an error included in information indicating a posture of an object is provided, the error correction method includes correcting, on a basis of first posture information indicating the posture of the object and externally received, an error included in second posture information indicating the posture of the object calculated on a basis of a detection result from an inertial measurement unit provided on the object.

According to still another aspect of the present disclosure, an error correction program executed by an information processing apparatus and correcting an error included in information indicating a posture of an object, the error correction program causes the information processing apparatus to correct, on a basis of first posture information indicating the posture of the object and externally received, an error included in second posture information indicating the posture of the object calculated on a basis of a detection result from an inertial measurement unit provided on the object.

According to the above-described configuration, the error included in the detection result from the inertial measurement unit can be used to reduce a deviation between the posture of the object calculated on the basis of the detection result and the actual posture of the object.

DETAILED DESCRIPTION OF THE PREFERRED EMBODIMENT

An embodiment of the present disclosure will be described below on the basis of the drawings.

[General Configuration of Image Display System]

Figure 1:
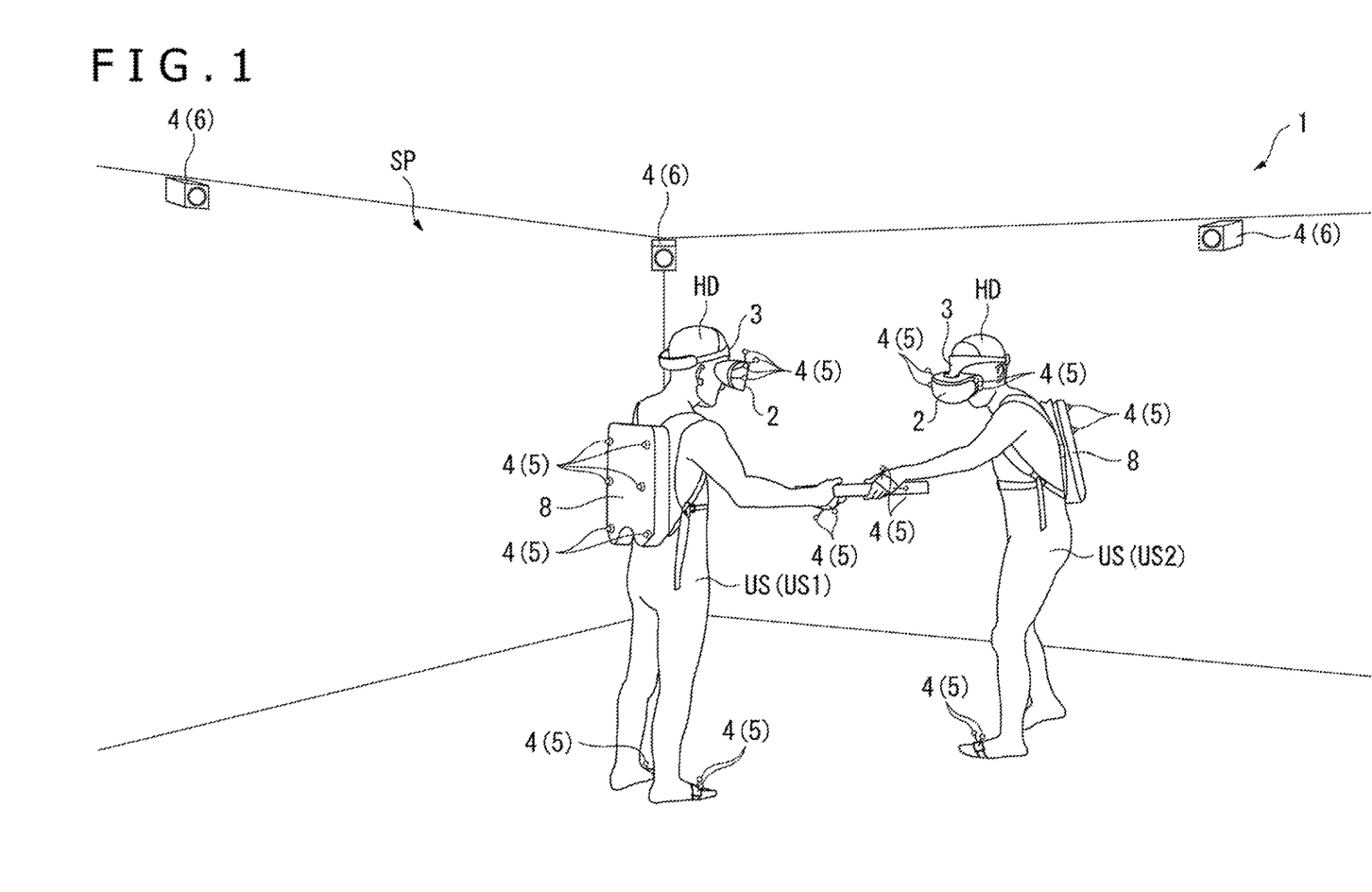
FIG. 1 is a schematic diagram illustrating a configuration of an image display system according to an embodiment of the present disclosure.
Figure 2:
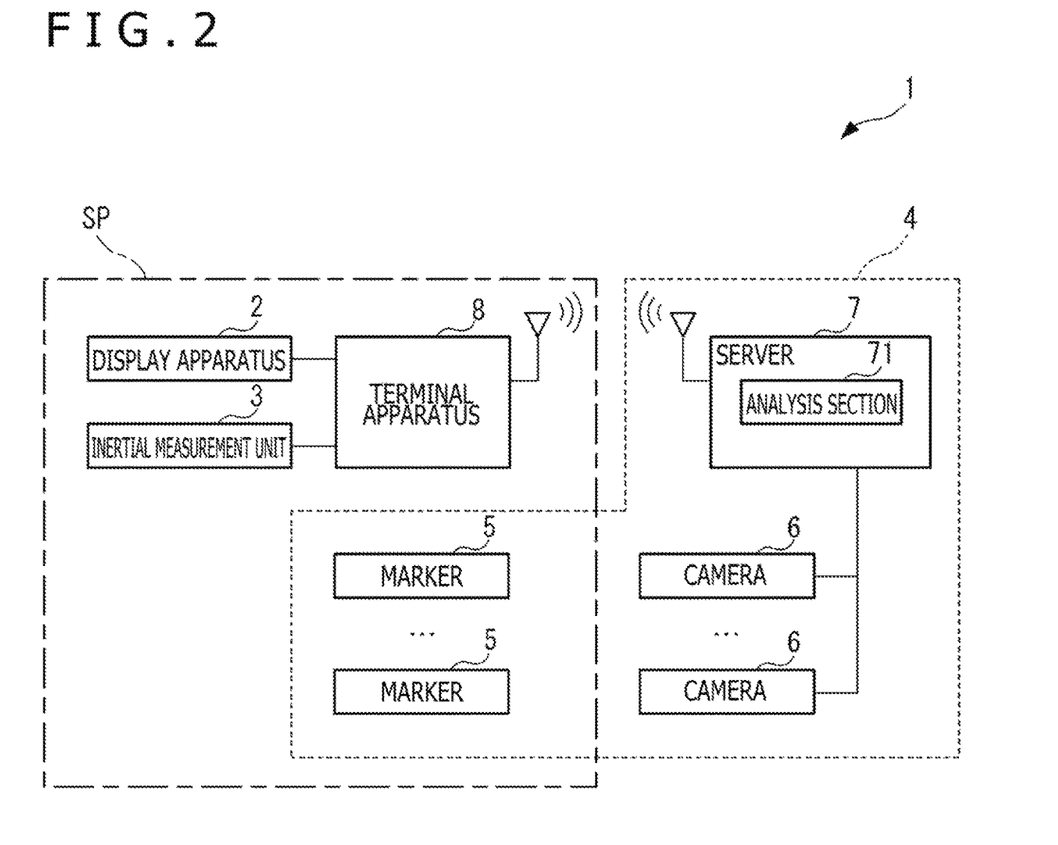
FIG. 2 is a block diagram illustrating a configuration of an image display system according to the embodiment.

FIG. 1 is a schematic diagram illustrating a configuration of an image display system 1 according to the present embodiment. FIG. 2 is a block diagram illustrating a configuration of the image display system 1. Note that FIG. 1 illustrates the configuration in which two users US are assumed to be in a three-dimensional space SP but that FIG. 2 illustrates the configuration in which one user US is assumed to be in the three-dimensional space SP.

The image display system 1 according to the present embodiment includes a posture estimation system and presents a user corresponding to an object positioned in a three-dimensional space with images corresponding to the position and posture of the user. Specifically, the image display system 1 is a Virtual Reality (VR) system or an Augmented Reality (AR) system setting a viewpoint in a virtual space according to the position and posture of the user in the three-dimensional space and displaying, to the user, an image of the virtual space drawn on the basis of the set viewpoint. Such an image display system 1 can be applied to a match-type fighting game in which, for example, a plurality of users US (US1 and US2) fight each other as illustrated in FIG. 1.

As illustrated in FIG. 1 and FIG. 2, the image display system 1 includes a display apparatus 2, an inertial measurement unit 3, a camera system 4, and a terminal apparatus 8.

[Configuration of Display Apparatus]

The display apparatus 2 corresponds to a display section mounted on each of the users US to display input images. Specifically, the display apparatus 2 displays images input from the terminal apparatus 8 such that the user US can view the images. In the present embodiment, the display apparatus 2 includes a Head Mounted Display (HMD) mounted on a head HD of the user US. In particular, the display apparatus 2 is a non-transmissive head mounted display provided with the display section in front of the eyes of the user US to display images and configured to prevent an outside world from being observed. Specifically, the image display system 1 according to the present embodiment is a VR system. However, the display apparatus 2 is not limited to the non-transmissive head mounted display but may be a transmissive head mounted display. In this case, the image display system 1 can be configured as an AR system. Besides, the display apparatus 2 may be a display apparatus that can be carried by the user US, for example, a smartphone.

[Configuration of Inertial Measurement Unit]

The inertial measurement unit 3 corresponds to an inertial measurement section. The inertial measurement unit 3 is provided on the head HD of each of the users US to detect motion of the user US. In the present embodiment, the inertial measurement unit 3 is provided on the display apparatus 2 mounted on the head HD to particularly detect the head HD of the user US.

The inertial measurement unit 3 detects accelerations in three axes and angular speeds in three axes at a predetermined sampling rate. Specifically, the inertial measurement unit 3 includes a tri-axis acceleration sensor and a tri-axis gyro sensor. In the present embodiment, the sampling rate at which the acceleration and the angular speed are sampled by the inertial measurement unit 3 is 1000 frames per second (fps).

The inertial measurement unit 3 is connected to the terminal apparatus 8 through a cable to output, to the terminal apparatus 8, detection information including detected accelerations and angular speeds. In this case, the inertial measurement unit 3 outputs a time stamp obtained at the time point of detection of the accelerations and angular speeds and included in the detection information. Note that the time stamp may be a detection time or information indicating elapsed time from activation of the image display system 1.

[Configuration of Camera System]

The camera system 4 is a motion capture system processing a captured image of each of the users US in the three-dimensional space to analyze the position and posture of the user US. As illustrated in FIG. 1 and FIG. 2, the camera system 4 includes, in addition to a plurality of markers 5 and a plurality of cameras 6, a server 7 serving as an analysis apparatus as illustrated in FIG. 2.

[Configuration of Makers]

The plurality of markers 5 are provided on respective positions on the body of each of the users US, and images of the markers 5 are captured by the plurality of cameras 6. The plurality of markers 5 are provided at positions where the motion of the user US can be detected when the user US moves. Examples of the regions of the body of the user US with which the markers 5 are provided include the head, the backs of the right and left hands, the tops of the right and left feet, and the torso.

The markers 5 may each be shaped like a sphere including a semi-sphere or like a sheet.

[Configuration of Camera]

Figure 3:
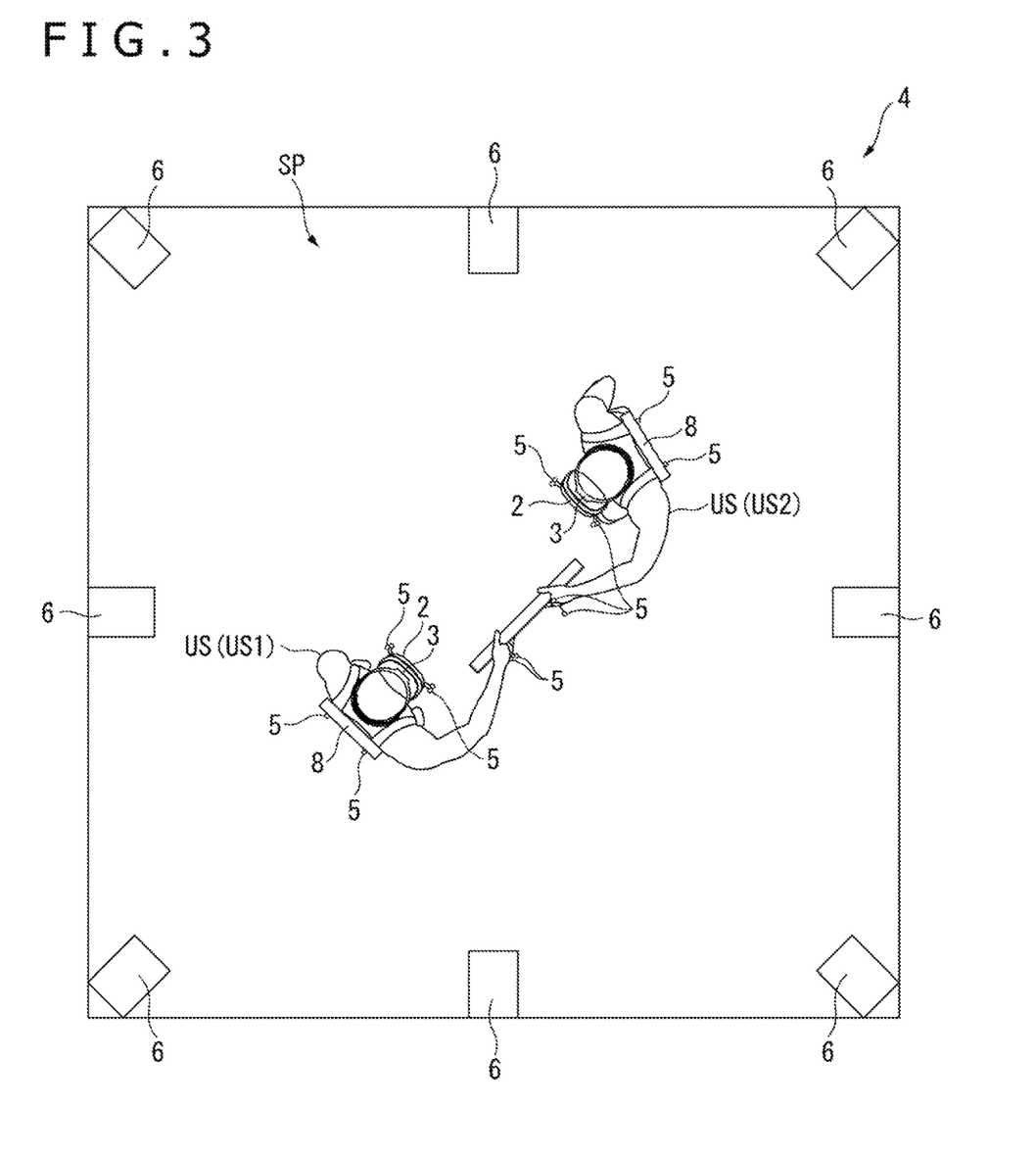
FIG. 3 is a plan view illustrating an example of arrangement of a plurality of cameras according to the embodiment.

FIG. 3 is a plan view illustrating an example of arrangement of the plurality of cameras 6.

As illustrated in FIG. 3, the plurality of cameras 6 are provided at regular intervals surrounding the three-dimensional space SP set as a movable range of each of the users US. In the present embodiment, as the plurality of cameras 6, eight cameras are provided on the periphery of the three-dimensional space SP with an image capturing direction of each of the cameras facing the interior of the three-dimensional space SP. Note that the number of cameras 6 can be appropriately changed.

The plurality of cameras 6 transmit captured images to the server 7. In the present embodiment, each camera 6 has an image capturing rate of 200 fps.

[Configuration of Server]

The server 7 includes an analysis section 71 analyzing the motion of each of the users US in the three-dimensional space SP on the basis of captured images transmitted from the plurality of cameras 6.

Specifically, the analysis section 71 analyzes the position and posture of the user US in the three-dimensional space SP on the basis of variation in the positions of the markers 5 obtained by chronologically processing captured images. The analysis section 71 acquires analysis information including analyzed position information indicating the analyzed position of the user US and analyzed posture information indicating the analyzed posture of the user US. The server 7 then wirelessly transmits the analysis information to the terminal apparatus 8 provided on the user US to be analyzed. At this time, the server 7 transmits a time stamp indicating the timing of capturing of the captured image for which the analysis section 71 has analyzed the position and the posture, the time stamp being included in the analysis information. In other words, the analyzed posture information includes the time stamp. Note that the analyzed posture information corresponds to first posture information and that the analyzed position information corresponds to first position information.

Note that the time stamp may be the time of image capturing of the captured image used for the analysis of the position and posture by the analysis section 71, or information indicating, for example, an elapsed time from activation of the image display system 1. The time stamp from the server 7 and the time stamp from the inertial measurement unit 3 are matched with each other, for example, when the image display system 1 is activated.

Additionally, information transmission from the server 7 to the terminal apparatus 8 may be performed using a communication scheme complying with a near field communication standard such as Bluetooth (registered trademark) or a communication scheme complying with a wireless communication standard such as wireless Local Area Network (LAN).

The wireless communication is used between the server 7 and the terminal apparatus 8 as described above to prevent, when the server 7 and the terminal apparatus 8 are connected through a cable, the motion of the user US wearing the terminal apparatus 8 from being obstructed by the cable.

[Configuration of Terminal Apparatus]

Figure 4:
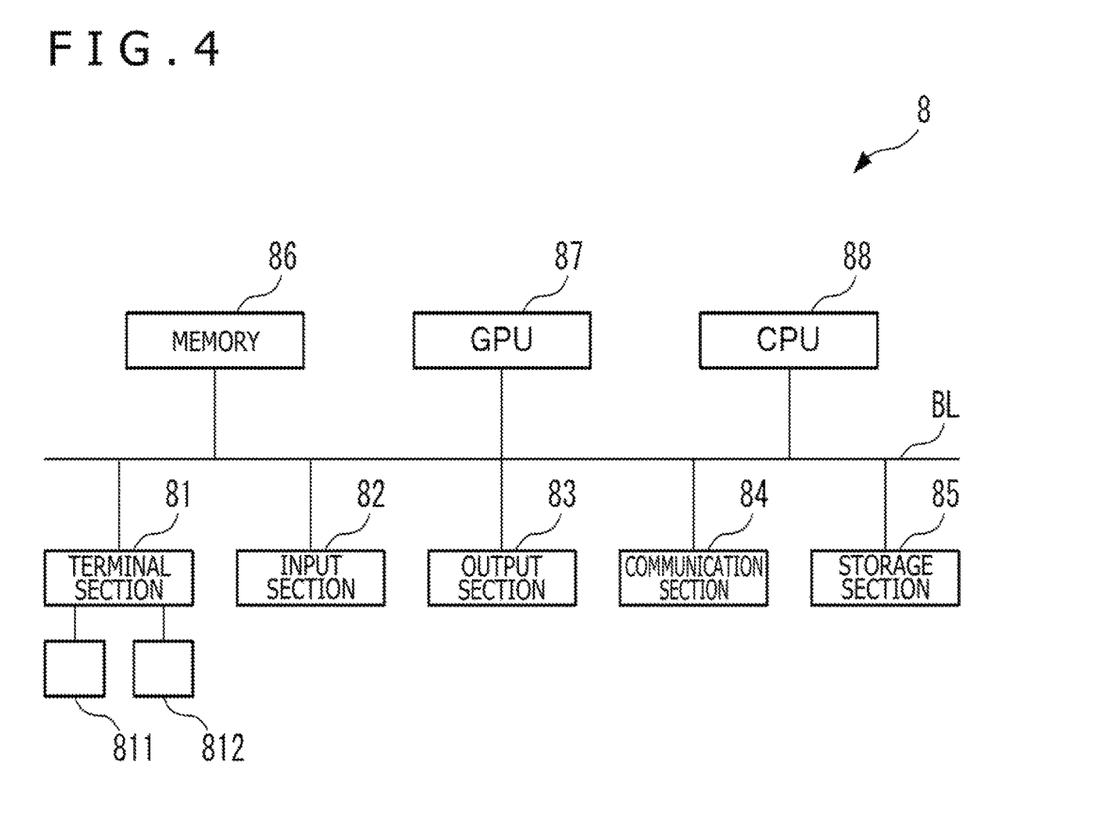
FIG. 4 is a block diagram illustrating a configuration of a terminal apparatus according to the embodiment.

FIG. 4 is a block diagram illustrating a configuration of the terminal apparatus 8.

The different terminal apparatus 8 is provided for the respective users US and are each connected to the display apparatus 2 and the inertial measurement unit 3 through cables and wirelessly communicate with the server 7. The terminal apparatus 8 can be configured using a Personal Computer (PC) or the like and executes applications such as games. For example, the terminal apparatus 8 estimates the position and posture of the user US on the basis of information acquired from the inertial measurement unit 3 and the server 7, and outputs, to the display apparatus 2, an image corresponding to the estimated position and posture. In other words, the terminal apparatus 8 is a type of information processing apparatus and corresponds to a posture estimation apparatus.

As illustrated in FIG. 4, the terminal apparatus 8 as described above includes a terminal section 81, an input section 82, an output section 83, a communication section 84, a storage section 85, a memory 86, a Graphics Processing Unit (GPU) 87, and a Central Processing Unit (CPU) 88, and these components are connected together through a bus line BL.

The terminal section 81 includes a plurality of terminals to which cables connected to external apparatuses are connected. The terminals provided in the terminal section 81 include, for example, general-purpose connection terminals such as Universal Serial Bus (USB) terminals, and video terminals such as high-definition multimedia interface (HDMI (registered trademark)). In the present embodiment, the terminal section 81 includes a terminal 811 connected to the display apparatus 2 and a terminal 812 connected to the inertial measurement unit 3.

The input section 82 corresponds to an acquisition section acquiring information input from any of the external apparatuses via the terminal section 81. The input section 82 outputs the acquired information to the CPU 88 via the bus line BL. For example, the input section 82 acquires detection information from the inertial measurement unit 3 connected to the input section 82 via the terminal 812, and outputs the acquired detection information to the CPU 88.

Under the control of the CPU 88, the output section 83 outputs information input from the CPU 88 via the bus line BL, to a destination external apparatus included in the external apparatuses connected to the terminal section 81. For example, the output section 83 outputs an image drawn by the GPU 87, to the display apparatus 2 connected to the terminal 811.

Under the control of the CPU 88, the communication section 84 communicates wirelessly with any of the external apparatuses to transmit and receive information to and from the external apparatuses. For example, the communication section 84 communicates with the server 7 to receive analysis information from the server 7 and output the received analysis information to the CPU 88. In other words, the communication section 84, along with the input section 82, constitutes the acquisition section.

Communication by the communication section 84 as described above is performed in compliance with the above-described communication scheme.

The storage section 85 stores programs and data for operations of the terminal apparatus 8. For example, the storage section 85 stores an Operating System (OS) and a game application, and also stores an error correction program described below.

The memory 86 forms a work area for the GPU 87 and the CPU 88. For example, the memory 86 temporarily stores a part of the program stored in the storage section 85 and a part of the data stored in the storage section 85.

The GPU 87 draws, under the control of the CPU 88, an image to be output to the display apparatus 2, and corresponds to a drawing section. Specifically, the GPU 87 sets, in a virtual space developed by the CPU 88 executing a game application, a viewpoint corresponding to the position and posture of the user US identified by the CPU 88, and draws an image of the virtual space from the viewpoint of the user US, on the basis of a preset viewpoint and a preset light source. Thus, the drawn image is read from the memory 86 and output to the display apparatus 2 by the output section 83.

Figure 5:
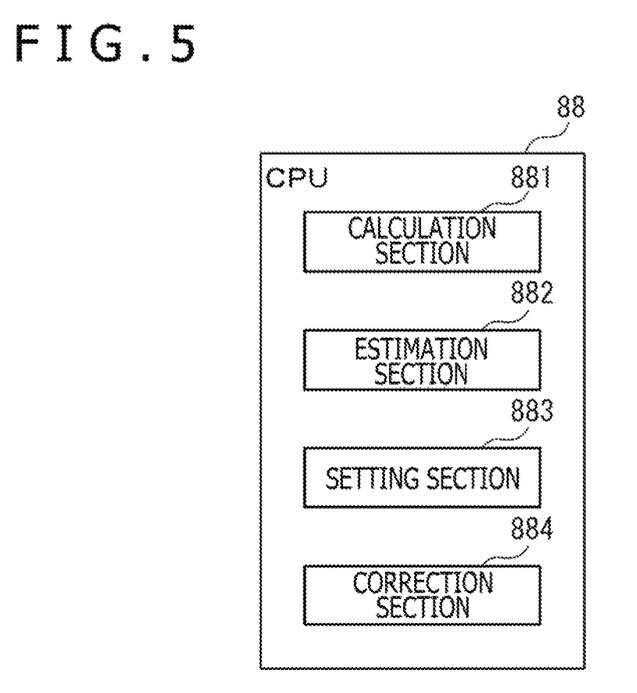
FIG. 5 is a block diagram illustrating a functional configuration of a central processing unit (CPU) according to the embodiment.

FIG. 5 is a block diagram illustrating a functional configuration of the CPU 88.

The CPU 88 executes the program stored in the storage section 85 to operate the terminal apparatus 8. For example, the CPU 88 executes an OS stored in the storage section 85 to operate the terminal apparatus 8, and executes the game application stored in the storage section 85 to move a game forward.

Besides, the CPU 88 estimates the position and posture of the user US in the three-dimensional space SP on the basis of the detection information input from the inertial measurement unit 3 and the analysis information received from the server 7, and sets, in the virtual space, a viewpoint and a light source corresponding to the position and posture of the user US. Additionally, the CPU 88 corrects, on the basis of the analysis information received from the server 7, the position and posture of the user US calculated on the basis of the detection information from the inertial measurement unit 3.

As illustrated in FIG. 5, the CPU 88 as described above includes a calculation section 881, an estimation section 882, a setting section 883, and a correction section 884.

The calculation section 881 sequentially adds, to an initial value, detection information input from the inertial measurement unit 3, and calculates the position and posture of the user US based on the detection information. Information indicating the position of the user US calculated by the calculation section 881 is designated as calculated position information. Information indicating the posture of the user US calculated by the calculation section 881 is designated as calculated posture information. Information including the calculated position information and the calculated posture information is designated as calculated information. Note that the calculated posture information corresponds to second posture information and that the calculated position information corresponds to second position information.

Specifically, the initial value is detection information detected by the inertial measurement unit 3 when the user US is located at a predetermined position in the three-dimensional space SP and is in a predetermined posture. The calculation section 881 sequentially adds, to the initial value, the detection information input from the inertial measurement unit 3 to calculate the calculated posture information and the calculated position information.

Specifically, the calculation section 881 adds, to the last calculated posture information, newly acquired detection information (particularly an angular speed component) to calculate the latest calculated position information. Additionally, the calculation section 881 adds, to the last calculated position information, newly acquired detection information (particularly an acceleration component) to calculate the latest calculated position information.

Note that the detection information from the inertial measurement unit 3 includes an error and thus that an error is included in the calculated posture information and calculated position information calculated by the calculation section 881. In particular, the angular speed used to calculate the posture of the user US is detected by the gyro sensor included in the inertial measurement unit 3, but due to properties of the gyro sensor, sequential addition of detected angular speeds leads to accumulated errors, increasing, over time, a deviation between the posture indicated by the calculated posture information and the actual posture of the user US.

Thus, the correction section 884 described below corrects the calculated posture information and the calculated position information. Error correction processing executed by the correction section 884 will be described below in detail.

The estimation section 882 estimates the current position and current posture of the user US in the three-dimensional space SP on the basis of the calculated posture information and calculated position information as well as the analyzed posture information and analyzed position information included in the analysis information received from the server 7.

Specifically, the estimation section 882 estimates the current posture of the user US by synthesizing the received analyzed posture information and the calculated posture information when the analysis information is received from the server 7. Similarly, the estimation section 882 estimates the current position of the user US by synthesizing the received analyzed position information and the calculated position information when the analysis information is received from the server 7.

Note that the calculated posture information and calculated position information used to estimate the current position and current posture of the estimation section 882 correspond to the calculated posture information and calculated position information corrected by the correction section 884.

Figure 6:
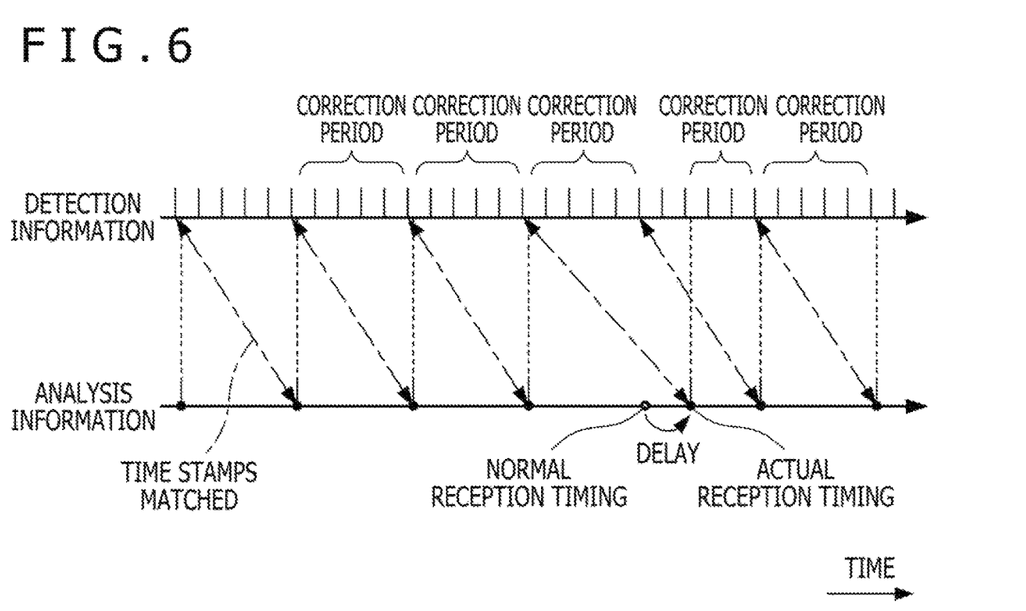
FIG. 6 is a diagram illustrating an input timing for detection information and a reception timing for analysis information according to the embodiment.

FIG. 6 is a diagram illustrating an input timing for the detection information from the inertial measurement unit 3 and a reception timing for the analysis information from the server 7. Note that the input timing for the detection information is illustrated in an upper stage of FIG. 6 and that the reception timing for the analysis information is illustrated in a lower stage of FIG. 6.

In this case, since the inertial measurement unit 3 and the terminal apparatus 8 are connected through a cable, the detection information from the inertial measurement unit 3 is periodically input to the terminal apparatus 8 as illustrated by vertical lines in the upper stage of FIG. 6. Note that an input rate for the detection information is 1000 fps, which is equal to a sampling rate at which the acceleration and the angular speed are sampled by the inertial measurement unit 3.

On the other hand, the server 7 and the terminal apparatus 8 are connected together for wireless communication. Thus, normally, the analysis information from the server 7 is periodically received by the terminal apparatus 8 as illustrated by black circles in the lower stage of FIG. 6. A reception rate for the analysis information is 200 fps, which is equal to a sampling rate at which the analysis information is sampled by the camera system 4.

However, factors such as a wireless environment may cause the analysis information to be received by the terminal apparatus 8 at a timing later than a normal reception timing. For example, in the lower stage of FIG. 6, the analysis information, otherwise received at a timing illustrated by a white circle, may be received at a timing illustrated by a black circle later than the timing illustrated by the white circle.

In such a case, the estimation section 882 estimates the current position and the current posture on the basis of the newly received analysis information and the calculated information including information calculated by the calculation section 881 and corrected by the correction section 884.

The setting section 883 illustrated in FIG. 5 sets a viewpoint in the virtual space on the basis of the current position and current posture of the user US estimated by the estimation section 882. Accordingly, the GPU 87 draws an image corresponding to the viewpoint of the user US in the virtual space on the basis of the set viewpoint and the preset light source. Note that the setting section 883 may set the position of the light source in the virtual space in accordance with an operation by the user US or the like.

Besides, the setting section 883 sets the input rate for the detection information input from the inertial measurement unit 3, and sets the reception rate for the analysis information received from the server 7. Note that the input rate for the detection information and the reception rate for the analysis information may be preset or may be acquired from the inertial measurement unit 3 and the server 7 and set.

Figure 7:
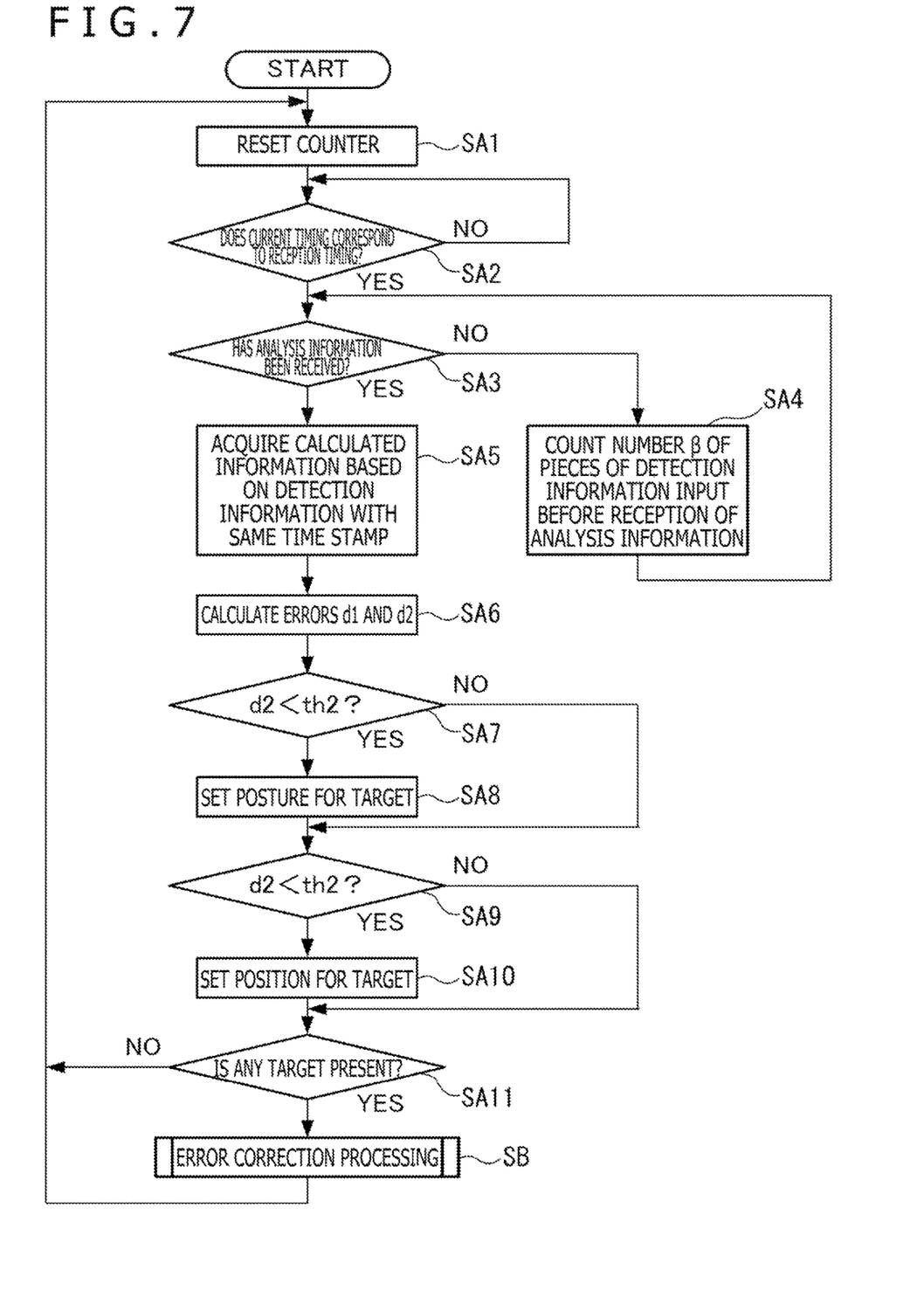
FIG. 7 is a flowchart illustrating error correction processing according to the embodiment.

FIG. 7 is a flowchart illustrating error correction processing executed by the correction section 884.

The correction section 884 corrects, on the basis of the analyzed posture information and analyzed position information included in the analysis information, the calculated posture information and calculated position information calculated by the calculation section 881 on the basis of the detection information. Specifically, the correction section 884 corrects the calculated posture information and the calculated position information by implementing error correction processing illustrated in FIG. 7. The error correction processing is implemented by the correction section 884 by executing the error correction program stored in the storage section 85.

In the error correction processing, first, the correction section 884 resets a counter counting the number of pieces of detection information input (step SA1).

Then, the correction section 884 determines whether or not the current timing corresponds to the reception timing for the analysis information (step SA2). Specifically, in step SA2, the correction section 884 identifies the reception timing for the next analysis information on the basis of the set reception rate and the reception timing for the analysis information received in the past, and determines whether or not the current timing corresponds to the identified reception timing.

In a case of determining, in the determination processing in step SA2, that the current timing does not correspond to the reception timing (step SA2: NO), the correction section 884 repeatedly executes step SA2 until the reception timing.

In a case of determining, in the determination processing in step SA2, that the current timing corresponds to the reception timing (step SA2: YES), the correction section 884 determines whether or not the analysis information has been received (step SA3). This processing takes into account the possibility that reception of the analysis information is delayed.

In a case of determining, in the determination processing in step SA3, that the analysis information has not been received (step SA3: NO), the correction section 884 counts the number of pieces of detection information input before the analysis information to be received is received (step SA4) and returns the processing to step SA3.

In a case of determining, in the determination processing in step SA3, that the analysis information has been received (step SA3: YES), the correction section 884 acquires the calculated information calculated by the calculation section 881 on the basis of detection information including substantially the same time stamp as that included in the received analysis information (step SA5). Note that, in a case where no detection information is present that includes the same time stamp as that included in the received analysis information, the calculated information is acquired that is based on the detection information including a time stamp closest to the time stamp included in the analysis information.

Then, the correction section 884 calculates an error between the analysis information and calculated information acquired (step SA6). Specifically, the correction section 884 calculates a difference d1 between the analyzed posture information and calculated posture information, and further calculates a difference d2 between the analyzed position information and the calculated position information. Specifically, the correction section 884 acquires, as the difference d1, a value resulting from subtraction of the analyzed posture information from the calculated posture information, and acquires, as the difference d2, a value resulting from subtraction of the analyzed position information from the calculated position information.

Subsequently, the correction section 884 determines whether or not the absolute value of the difference d1 for the posture is smaller than a preset threshold th1 (step SA7).

In a case where, in the determination processing in step SA7, the absolute value of the difference d1 is equal to or larger than the threshold th1 (step SA7: NO), the correction section 884 transfers the processing to step SA9. In a case where erroneous analyzed posture information is received from the server 7 for a reason such as erroneous measurement, the absolute value of the difference d1 is relatively large. Thus, in a case where the absolute value of the difference d1 is equal to or larger than the threshold th1, the correction section 884 determines that erroneous analyzed posture information has been received, and omits correction of the calculated posture information based on the analyzed posture information.

On the other hand, in a case where, in the determination processing in step SA7, the absolute value of the difference d1 is smaller than the threshold th1 (step SA7: YES), the correction section 884 sets the "posture" as an error correction target (step SA8). Then, the correction section 884 transfers the processing to step SA9.

In step SA9, the correction section 884 determines whether or not the absolute value of the difference d2 for the position is smaller than a present threshold th2 (step SA9).

In the determination processing in step SA9, in a case where the absolute value of the difference d2 is equal to or larger than the threshold th2 (step SA9: NO), the correction section 884 transfers the processing to step SA11. As described above, in a case where the absolute value of the difference d2 is equal to or larger than the threshold th2, the correction section 884 determines that erroneous analyzed position information has been received, and omits correction of the calculated position information based on the analyzed position information.

In the determination processing in step SA9, in a case where the absolute value of the difference d2 is smaller than the threshold th2 (step SA9: YES), the correction section 884 sets the "position" as an error correction target (step SA10). Then, the correction section 884 transfers the processing to step SA11.

Note that the position of the user US can be relatively accurately estimated compared to the posture of the user US. Thus, to prevent the error correction processing SB from being frequency executed for the position, the threshold th2 is set to a smaller value than the threshold th1.

In step SA11, the correction section 884 determines whether or not any error correction target has been set (step SA11). Specifically, in step SA11, the correction section 884 determines whether or not the "posture" or the "position" has been set as an error correction target in steps SA8 and SA10.

In a case of determining, in the determination processing in step SA11, that no error correction target is present, the correction section 884 returns the processing to step SA1.

In a case of determining, in the determination processing in step SA11, that an error correction target is present, the correction section 884 executes the error correction processing SB on the set error correction target.

Figure 8:
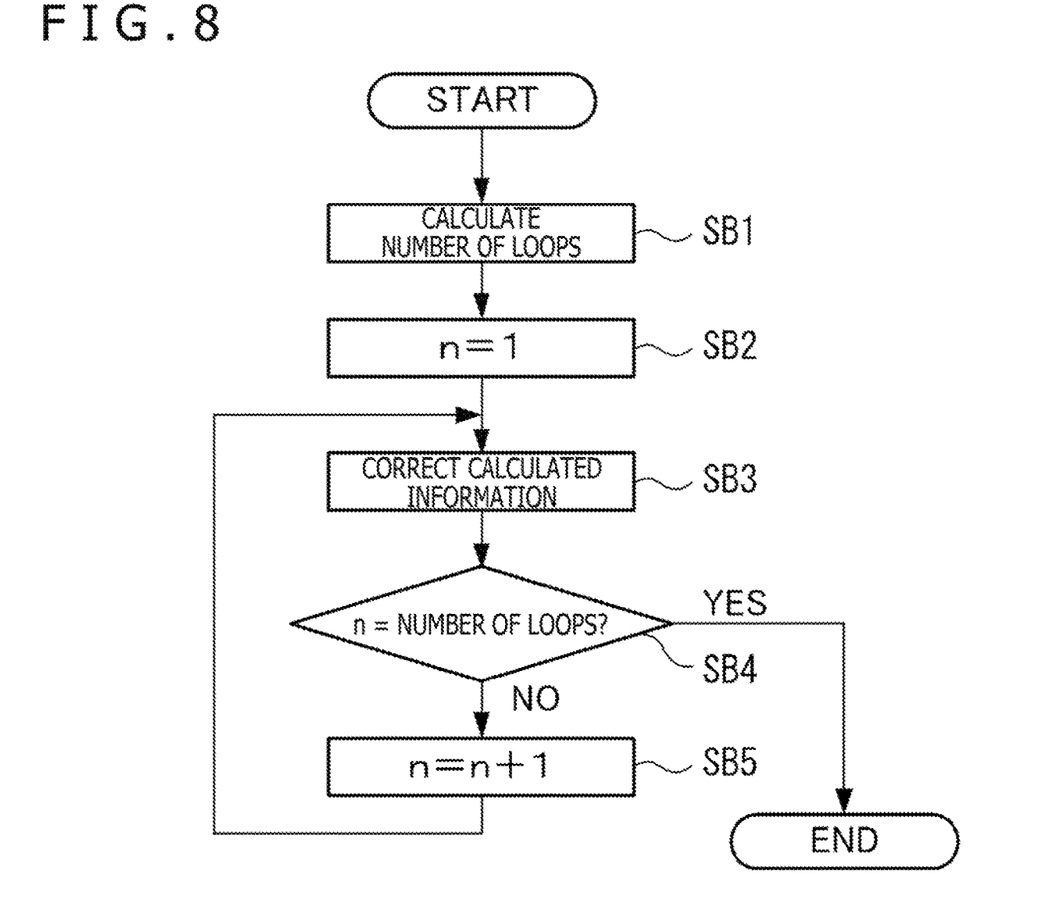
FIG. 8 is a flowchart illustrating error correction processing according to the embodiment.

FIG. 8 is a flowchart illustrating the error correction processing SB.

In the error correction processing SB, the correction section 884 first calculates the number of loops as illustrated in FIG. 8 (step SB1). Specifically, the correction section 884 calculates, as the number of loops, the integer value of a value obtained by subtracting the number β of pieces of detection information counted in step SA4 described above from a value resulting from division of the input rate for the detection information by the reception rate for the analysis information. This processing is intended to execute step B3 by the number of times of detection information input during a period from the reception timing for the analysis information until the reception timing for the next analysis information. Note that, in a case where the analysis information is received at a normal reception timing, step SA4 is not executed and the number β of pieces of detection information is 0.

Then, the correction section 884 sets the loop counter n to 1 (step SB2).

Subsequently, the correction section 884 corrects an error included in the information set as the error correction target, that is, one of the calculated posture information and the calculated position information (step SB3).

Specifically, in a case where the posture is set as the error correction target, in step SB3, the correction section 884 corrects the latest calculated posture information by subtracting a correction value C1 indicated by Equation (1) from the latest calculated posture information. Note that, in Equation (1), d1 denotes the difference d1 and that β denotes the number β of pieces of detection information counted in step SA4. R1 denotes the input rate for the detection information, and r1 denotes the reception rate for the analysis information. α1 denotes a value indicating the degree of reflection referring to the degree to which the difference d1 is reflected in the calculated posture information, that is, the degree to which the calculated posture information is made closer to the analyzed posture information. α1 is larger than 0 and equal to or smaller than 1. However, in a case where R1/r1<β holds true, (R1/r1−β), which is the denominator of the right side of Equation (1), is treated as 1.

[Math. 1]

$$\text{Correction value } C1 = (d1 \times \alpha 1)/(R1/r1 - \beta) \quad (1)$$

Additionally, in a case where the position is set as the error correction target, in step SB3, the correction section 884 subtracts a correction value C2 indicated by Equation (2) from the latest calculated position information. Note that, in Equation (2), d2 denotes the difference d2. β, R1, and r1 are the same as β, R1, and r1 in Equation (1) described above. α2 denotes a value indicating the degree of reflection referring to the degree to which the difference d2 is reflected in the calculated position information, that is, the degree to which the calculated position information is made closer to the analyzed position information. α2 is larger than 0 and equal to or smaller than 1. Note that α2 may be the same as or different from α1. However, also in Equation (2), in a case where R1/r1<β holds true, (R1/r1−β), which is the denominator of the right side of Equation (2), is treated as 1.

[Math. 2]

$$\text{Correction value } C2 = (d2 \times \alpha 2)/(R1/r1 - \beta) \quad (2)$$

For example, in a case where the number of loops is five, the number of times of step SB3 to be executed is five. In this case, each time step SB3 is executed, the error included in the calculated posture information is corrected by (d1×α1)/5 and the error included in the calculated position information is corrected by (d2×α2)/5.

Here, as described above, the calculation section 881 calculates the latest calculated information for each input of the detection information, and the estimation section 882 estimates the position and posture of the user US on the basis of the calculated latest calculated information and analysis information. However, in a case where, for example, step SB3 is executed a plurality of times before the input timing for the next detection information to significantly correct the calculated information, the calculated information varies significantly to cause significant variation in the estimated position and posture of the user US. In this case, an image drawn according to the position and posture of the user US varies significantly compared to the last image, causing the user to feel uncomfortable when viewing the image displayed by the display apparatus 2.

Thus, step SB3 is preferably executed with a cycle corresponding to the input rate for the detection information. Specifically, step SB3 is preferably executed once between the input timing for certain detection information and the input timing for the next detection information.

Step SB3 executed as described above suppresses significant variation in calculated information before the input timing for the next detection information, and thus suppresses the uncomfortable feeling of the user.

Additionally, even in a case where the following rates are high: a drawing rate at which the GPU 87 draws images, an output rate at which images are output to the display apparatus 2, and an update rate at which the display apparatus 2 updates images, the error in calculated information is gradually corrected to enable reduction in difference between the last drawn, output, and displayed image and the image to be drawn, output, and displayed next. Accordingly, also in this regard, the user can be restrained from being uncomfortable.

Then, the correction section 884 determines whether or not the current loop counter n has reached the number of loops (step SB4).

In a case of determining, in the determination processing in step SB4, that the loop counter n has not reached the number of loops (step SB4: NO), the correction section 884 increments the loop counter n by one (step SB5).

Subsequently, the correction section 884 returns the processing to step SB3.

In a case of determining, in the determination processing in step SB4, that the loop counter n has reached the number of loops (step SB4: YES), the correction section 884 ends the error correction processing SB. A correction period when the error correction processing SB as described above is executed to correct the calculated information corresponds to a period from reception of the analysis information until the reception timing when the next analysis information is assumed to be received, as illustrated in FIG. 6.

In a case where the error correction processing SB ends, the correction section 884 returns the processing to step SA1 as illustrated in FIG. 7. In other words, the correction of the calculated information by the correction section 884 is repeatedly performed.

Note that, in a case where the difference d1 is equal to or smaller than the threshold th1, the difference d2 is equal to or smaller than the threshold th2, and the error correction processing SB for the calculated posture information and the error correction processing SB for the calculated position information are each executed, the error correction processing SB for the calculated posture information and the error correction processing SB for the calculated position information may be separately executed. Alternatively, after execution of one of the error correction processing SB for the calculated posture information and the error correction processing SB for the calculated position information, the other error correction processing SB may be executed.

Effects of Embodiment

The image display system 1 according to the present embodiment described above can produce the following effects.

The image display system 1 including the posture estimation system includes the inertial measurement unit 3, the markers 5, the camera 6, the server 7, and the terminal apparatus 8. The markers 5 are mounted on the user US, which corresponds to an object. The camera 6 captures images of the user US. The analysis section 71 of the server 7 analyzes the posture of the user US on the basis of the positions of the markers 5 included in a captured image captured by the camera 6. The inertial measurement unit 3 used as the inertial measurement section is provided on the user US to detect motion of the user US.

The terminal apparatus 8 includes the calculation section 881, the estimation section 882, and the correction section 884. The calculation section 881 calculates calculated posture information indicating the posture of the user US on the basis of the detection information indicating a detection result from the inertial measurement unit 3. The estimation section 882 estimates the actual posture of the user US on the basis of the calculated posture information and the analyzed posture information indicating the posture of the user S analyzed by the analysis section 71. The correction section 884 corrects an error included in the calculated posture information on the basis of the analyzed posture information.

Such a configuration can correct errors accumulated in the calculated posture information calculated on the basis of the detection information input from the inertial measurement unit 3. Accordingly, the posture of the user US can be accurately estimated on the basis of the calculated posture information and the analyzed posture information.

The analyzed posture information includes a time stamp indicating a timing of image capturing of a captured image for which analyzed posture information has been analyzed. The detection information includes a time stamp indicating the timing of detection of the user US motion by the inertial measurement unit 3. The correction section 884 corrects the current calculated posture information on the basis of the analyzed posture information and the calculated posture information calculated on the basis of detection information including substantially the same time stamp as that included in the analysis information.

Accordingly, the current calculated posture information is corrected on the basis of the difference between the analyzed posture information and calculated posture information each corresponding to substantially the same posture of the user US. Thus, the calculated posture information, in which errors may be accumulated, can be appropriately corrected. This also applies to the calculated position information.

The correction section 884 omits correction of the calculated posture information used as the second posture information in a case where the absolute value of the difference d1 for the posture is larger than the threshold th1. The correction section 884 corrects the calculated posture information in a case where the absolute value of the difference d1 is equal to or smaller than the threshold th1.

Accordingly, in a case where the analyzed posture information received from the server 7 indicates an abnormal value, correction of the calculated posture information based on this analyzed posture information can be inhibited.

Note that, in a case where the absolute value of the difference d2 for the position is larger than the threshold th2, the correction section 884 omits correction of the calculated position information, allowing production of effects similar to the above-described effects.

The correction section 884 corrects the calculated posture information by repeatedly subtracting the correction value C1 indicated by Equation (1) described above from the calculated posture information, used as the second posture information, according to the number of pieces of detection information input from the time of reception of analysis information including the analyzed posture information until a timing assumed to receive the next analysis information.

Accordingly, the calculated posture information can be accurately corrected without dependence on an input state of the detection information and a reception state of the analysis information. Furthermore, minor changes are reflected in the calculated posture information in a timely manner to suppress occurrence of a rapid change in the posture of the user US estimated by the estimation section 882. This also applies to the position of the user US estimated by the estimation section 882. This enables the display apparatus 2, on which images based on the estimated posture and position of the user US are displayed, to display images reflecting natural changes in the posture and position of the user US, allowing the user US to be restrained from feeling uncomfortable due to a rapid change in display contents.

The image display system 1 including the posture estimation system is mounted on the user US and includes the display apparatus 2, used as a display section displaying input images. The terminal apparatus 8 includes the GPU 87, used as the drawing section drawing, in the virtual space, an image from the viewpoint set according to the posture and position of the user US estimated by the estimation section 882, and the output section 83 outputting, to the display apparatus 2, the image drawn by the GPU 87.

According to such a configuration, the posture and position of the user US can be accurately estimated, thus allowing construction of a VR system that can present, in the virtual space, the user US with images corresponding to the viewing direction of the user US.

The image display system 1 used as the posture estimation system includes the server 7 used as an analysis apparatus acquiring captured images captured by the camera 6, and the terminal apparatus 8 provided on the user US, serving as the object, to acquire the detection information from the inertial measurement unit 3, used as the inertial measurement section. The server 7 includes the analysis section 71, and the terminal apparatus 8 includes the calculation section 881, the estimation section 882, and the correction section 884.

According to such a configuration, the functions can be shared between the server 7 connected to the camera 6 and the terminal apparatus 8 connected to the inertial measurement unit 3. Accordingly, this configuration can reduce processing burdens compared to a configuration in which one apparatus includes the analysis section 71, the calculation section 881, the estimation section 882, and the correction section 884. This allows a small terminal apparatus to be employed as the terminal apparatus 8 provided on the user US.

The terminal apparatus 8 communicates wirelessly with the server 7. Additionally, the terminal apparatus 8 communicates with the inertial measurement unit 3 through a cable.

In such a configuration, the inertial measurement unit 3, detecting motion of the user US at a relatively high sampling rate and outputting the detection information, communicates with the terminal apparatus 8 through the cable, and thus the terminal apparatus 8 can acquire the detection information from the inertial measurement unit 3 without delay. Additionally, since the server 7 and the terminal apparatus 8 communicate wirelessly, the motion of the user US positioned in the three-dimensional space SP can be prevented from being obstructed by the cable.

The terminal apparatus 8, used as a posture estimation apparatus, includes the input section 82, the communication section 84, the calculation section 881, the estimation section 882, and the correction section 884. The communication section 84 receives, from the external server 7, the analyzed posture information (first posture information) indicating the analyzed posture of the user US. The input section 82 receives the detection information indicating the detection result from the inertial measurement unit 3 provided on the user US. The calculation section 881 calculates the calculated posture information (second posture information) indicating the posture of the user US. The estimation section 882 estimates the posture of the user US on the basis of the analyzed posture information and the calculated posture information. The correction section 884 corrects an error included in the calculated posture information.

Additionally, the CPU 88 of the terminal apparatus 8, used as an information processing apparatus, implements the error correction processing including the error correction method of correcting, on the basis of the analyzed posture information (first posture information) received from the external server 7, an error included in the calculated posture information (second posture information) indicating the posture of the user US calculated on the basis of the detection result from the inertial measurement unit 3 provided on the user US on the basis of the analyzed posture information.

Additionally, the CPU 88 of the terminal apparatus 8 executes the error correction program causing execution of the error correction processing SB including a correction step of correcting, on the basis of the analyzed posture information (first posture information) received from the external server 7, an error included in the calculated posture information (second posture information) indicating the posture of the user US calculated on the basis of the detection result from the inertial measurement unit 3 provided on the user US.

This allows production of effects similar to the effects of the image display system 1 used as the posture estimation system described above.

Modifications of Embodiment

The present disclosure is not limited to the above-described embodiment and includes modifications, improvements, and the like made to the embodiment to the extent that the object of the present disclosure can be accomplished.

In the above-described embodiment, the image display system 1 including the posture estimation system detects, analyze, and estimates not only the posture of the user US, serving as the object, but also the position of the user US. However, no such limitation is intended, and a configuration may be provided that estimates any one of the posture and position of the user US. Note that, in a case where only the posture of the user US is estimated, a gyro sensor may be employed instead of the inertial measurement unit 3.

In the above-described embodiment, the terminal apparatus 8 communicates wirelessly with the server 7, used as the analysis apparatus. However, no such limitation is intended, and the server 7 and the terminal apparatus 8 may communicate through a cable. Similarly, the inertial measurement unit 3 and the terminal apparatus 8 may communicate wirelessly.

In the above-described embodiment, the analysis information includes the time stamp for the timing of analysis of the position and posture of the user US, and the detection information includes the time stamp for the timing of detection of the user US motion. However, no such limitation is intended, in a case where the analysis information is received by the terminal apparatus 8 without delay, for example, in a case where the server 7 and the terminal apparatus 8 are connected through a cable, no time stamp needs to be included in the analysis information or the detection information. Note that some time may be required for the server 7 to calculate the analysis information and that the timing of transmission of the analysis information from the server 7 is assumed to be different from the timing of image capturing and analysis of the position and posture of the user US. Thus, in a case of a comparison of the analysis information and detection information resulting from analysis and detection at the same timing, the time stamps are preferably included in the analysis information and the detection information.

In the above-described embodiment, the calculated posture information is not corrected in a case where the difference d1 for the posture is larger than the threshold th1, and the calculated position information is not corrected in a case where the difference d2 for the posture is larger than the threshold th2. However, no such limitation is intended, and a configuration may be provided in which the correction section 884 corrects the calculated posture information and the calculated position information regardless of values of the differences d1 and d2.

In the above-described embodiment, the calculated posture information is corrected by sequential subtraction of the correction value C1 indicated by Equation (1) described above. Similarly, the calculated position information is corrected by sequential subtraction of the correction value C2 indicated by Equation (2) described above. However, no such limitation is intended, and the correction method for the calculated posture information and the calculated position information may be appropriately changed as long as the calculated posture information is corrected on the basis of the analyzed posture information and the calculated position information is corrected on the basis of the analyzed position information. For example, in a case where the difference d1 is smaller than the threshold th1, the corrected calculated posture information may be a value obtained by subtracting, from the calculated posture information, a value resulting from multiplication of the difference d1 by the degree of reflection α1. Similarly, in a case where the difference d2 is smaller than the threshold th2, the corrected calculated position information may be a value obtained by subtracting, from the calculated position information, a value resulting from multiplication of the difference d2 by the degree of reflection α2.

Additionally, for example, the correction section 884 may correct the calculated posture information by setting, as the difference d1, a value resulting from subtraction of the calculated posture information from the analyzed posture information, and adding, to the calculated posture information, the correction value C1 based on the difference d1. This also applies to the correction of the calculated position information.

In the above-described embodiment, the image display system 1 includes the display apparatus 2, and the terminal apparatus 8 includes the GPU 87, used as the drawing section, and the output section 83 outputting drawn images. However, no such limitation is intended, and the display apparatus 2, the GPU 87, and the output section 83 may be omitted. Even in this case, a system can be configured such that the position and posture of the user US in the three-dimensional space SP can be accurately estimated.

In the above-described embodiment, the user US is illustrated as the object. However, no such limitation is intended, and a living organism other than human beings or a moving body such as a robot may be illustrated as the object.

In the above-described embodiment, the error correction processing is implemented by the CPU 88 reading and executing the correction program stored in the storage section 85. However, no such limitation is intended, and the correction program may be recorded in a recording medium in a computer readable manner, and at the time of execution of the error correction processing, the CPU 88 may read the correction program from the recording medium for execution. The recording medium may be a disc type recording medium such as an optical disc, and a hard disk apparatus or a semiconductor memory can also be employed as the recording medium. Besides, the correction program may be acquired from an apparatus on the network. An information processing apparatus executes the correction program acquired as described above to allow production of effects similar to the effects of the terminal apparatus 8.

In the above-described embodiment, the CPU 88 of the terminal apparatus 8 executes the game application to proceed the game. Specifically, the image display system 1 is a VR game system or an AR game system. However, the intended use of the image display system 1 is not limited to the game. For example, the image display system 1 may be used for an experience-type attraction or the like or may be a system providing images of internal space of a museum, a display apartment, or the like.

In the above-described embodiment, the server 7 includes the analysis section 71 and is connected to the inertial measurement unit 3, and the terminal apparatus 8 communicating wirelessly with the server 7 includes the calculation section 881, the estimation section 882, and the correction section 884. However, the analysis section 71 may not necessarily be included in the server 7, and at least one of the calculation section 881, the estimation section 882, and the correction section 884 may not be included in the terminal apparatus 8.

For example, the server 7 may include the analysis section 71, the calculation section 881, the estimation section 882, and the correction section 884.

In this case, the server 7 may receive the detection information from the inertial measurement unit 3 wirelessly or through a cable. In a case where the server 7 wirelessly receives the detection information, the terminal apparatus 8 may wirelessly transmit, to the server 7, the detection information input from the inertial measurement unit 3.

In this case, the server 7 may transmit, to the terminal apparatus 8, estimated information indicating the position and posture of the user US and estimated by the estimation section 882, and the terminal apparatus 8 may draw an image based on the estimated information and output the drawn image to the display apparatus 2.

On the other hand, in this case, the server 7 may include the setting section 883 and the GPU 87, used as the drawing section, use the GPU 87 to draw an image based on the position and posture of the user US estimated by the estimation section 882, and transmit the drawn image to the display apparatus 2 wirelessly or through a cable.

Additionally, for example, the terminal apparatus 8 may include the analysis section 71, the calculation section 881, the estimation section 882, and the correction section 884. In this case, each of the plurality of cameras 6 may transmit captured images to the terminal apparatus 8 wirelessly or through a cable. Alternatively, a relay apparatus connected to the plurality of cameras 6 may transmit captured images acquired from each camera 6, to the terminal apparatus 8 wirelessly or through a cable.

Alternatively, for example, the inertial measurement unit 3 may include the calculation section 881 calculating the position and posture of the user US on the basis of the detection information, and the calculated information including the calculated position information and the calculated posture information may be transmitted from the inertial measurement unit 3 to the terminal apparatus 8 or the server 7.

It should be understood by those skilled in the art that various modifications, combinations, sub-combinations and alterations may occur depending on design requirements and other factors insofar as they are within the scope of the appended claims or the equivalents thereof.

What is claimed is:

1. A posture estimation system comprising:
   a marker that is mounted on an object;
   a camera that captures an image of the object;
   an analysis section that analyzes a posture of the object on a basis of a position of the marker included in a captured image captured by the camera;
   an inertial measurement section that is provided on the object to detect motion of the object;
   a calculation section that calculates calculated posture information indicating the posture of the object on a basis of detection information indicating a detection result from the inertial measurement section;
   an estimation section that estimates the posture of the object on a basis of the calculated posture information and analyzed posture information indicating the posture of the object analyzed by the analysis section; and
   a correction section that corrects an error included in the calculated posture information on a basis of the analyzed posture information,
   wherein the analyzed posture information includes a time stamp indicating a timing of image capturing of the captured image for which the analyzed posture information has been obtained by analysis,
   wherein the detection information includes a time stamp indicating a timing of detection of motion of the object by the inertial measurement section,
   wherein a sampling rate of the inertial measurement section is greater than a sampling rate of the image capturing, and
   wherein the correction section corrects a current piece of the calculated posture information on a basis of a difference between the analyzed posture information and the calculated posture information calculated on a basis of the detection information including a time stamp closest to the time stamp included in the analyzed posture information.

2. The posture estimation system according to claim 1, wherein
   the correction section does not correct the calculated posture information in a case where an absolute value of the difference is larger than a predetermined threshold, and
   the correction section corrects the calculated posture information in a case where the absolute value of the difference is equal to or smaller than the predetermined threshold.

3. The posture estimation system according to claim 1, wherein
   in a case of assuming
   that the difference is d1,
   that a degree of reflection being a value larger than 0 and equal to or smaller than 1 and being a degree to which the difference is reflected in the calculated posture information is α1, that the number of pieces of the detection information input from an assumed reception timing until actual reception of the analyzed posture information is $\beta$, that an input rate for the detection information is R1, and that a reception rate for the analyzed posture information is r1, the correction section corrects the calculated posture information by repeatedly subtracting a correction value C1 indicated by Equation (1) from the calculated posture information calculated by the calculation section according to the number of pieces of the detection information input from a time of reception of the analyzed posture information until a reception timing for a next piece of the analyzed posture information,

[Math. 1]

$$\text{Correction value } C1=(d1\times\alpha1)/(R1/r1-\beta) \quad (1)$$

However, in a case where $R1/r1<\beta$ holds true, $(R1/r1-\beta)$ is 1.

4. The posture estimation system according to claim 1, comprising:

a display section that is mounted on the object to display an input image;

a drawing section that draws, in a virtual space, an image from a viewpoint set according to the posture of the object estimated by the estimation section; and an output section that outputs, to the display section, the image drawn by the drawing section.

5. The posture estimation system according to claim 1, further comprising:

an analysis apparatus that acquires the captured image captured by the camera; and a terminal apparatus that is provided on the object to acquire the detection information from the inertial measurement section, wherein the analysis apparatus includes the analysis section, and the terminal apparatus includes the calculation section, the estimation section, and the correction section.

6. The posture estimation system according to claim 5, wherein the terminal apparatus communicates wirelessly with the analysis apparatus, and the terminal apparatus communicates with the inertial measurement section through a cable.

7. A posture estimation apparatus comprising:

a communication section that externally receives first posture information indicating a posture of an object, wherein the first posture information is captured at a first sampling rate and comprises a first timestamp;

an input section that receives detection information indicating detection results from an inertial measurement unit provided on the object, wherein the detection results are captured at a second sampling rate greater than the first sampling rate, and wherein the detection results comprise a second timestamp;

a calculation unit that calculates, on a basis of the detection information, second posture information indicating the posture of the object;

an estimation section that estimates the posture of the object on a basis of the first posture information and the second posture information; and a correction section that corrects, on the basis of the first posture information, an error included in the second posture information on a basis of a difference between the first posture information and the second posture information having the first timestamp and the second timestamp closest to each other.

* * * * *